G. RIGG & W. L. COURSEN.
FURNACE.
APPLICATION FILED APR. 19, 1916.
1,220,789.
Patented Mar. 27, 1917.
5 SHEETS—SHEET 1.
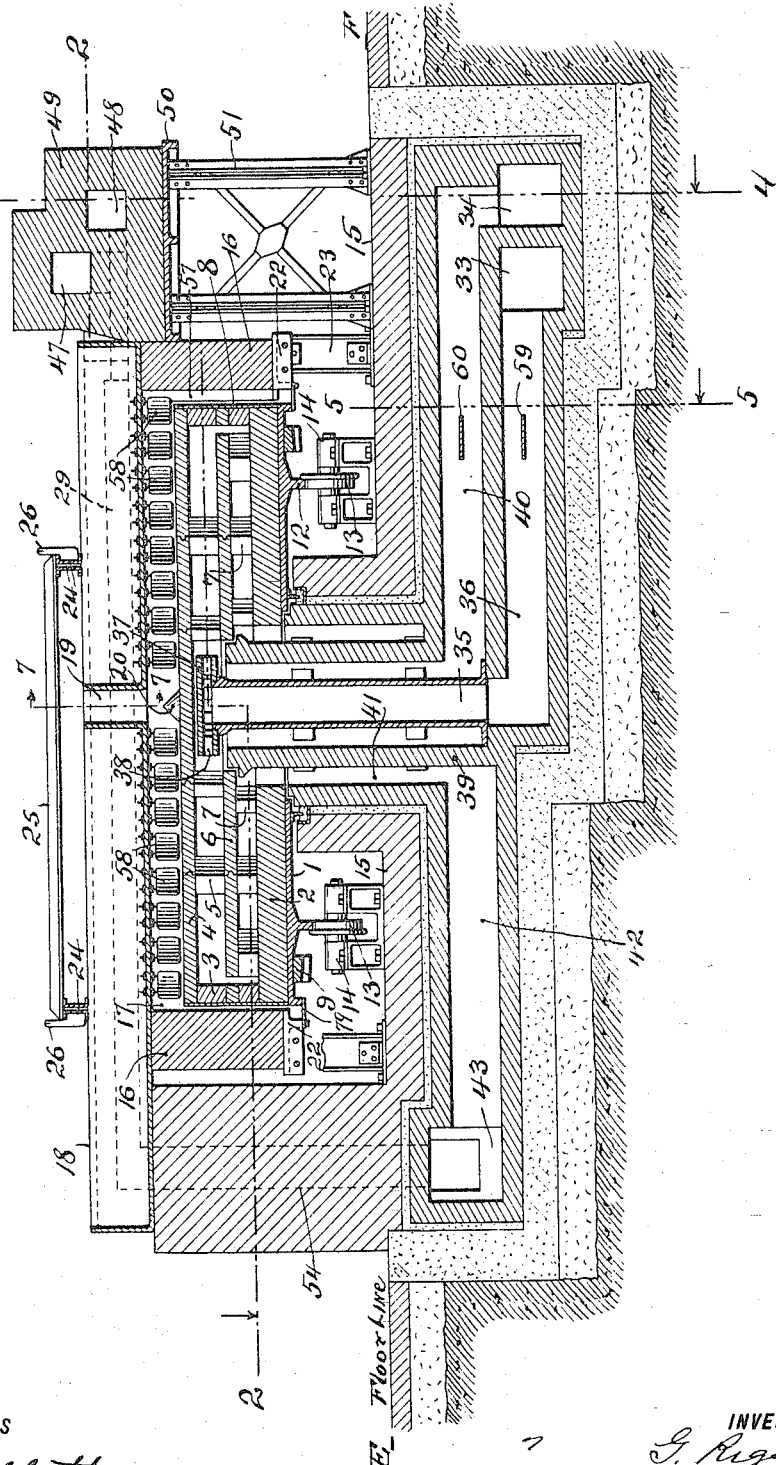
WITNESSES
H. C. Abbott
M. L. Bell
INVENTORS
G. Rigg
W. L. Coursen
BY
Pennie Davis & Marvin
ATTORNEYS

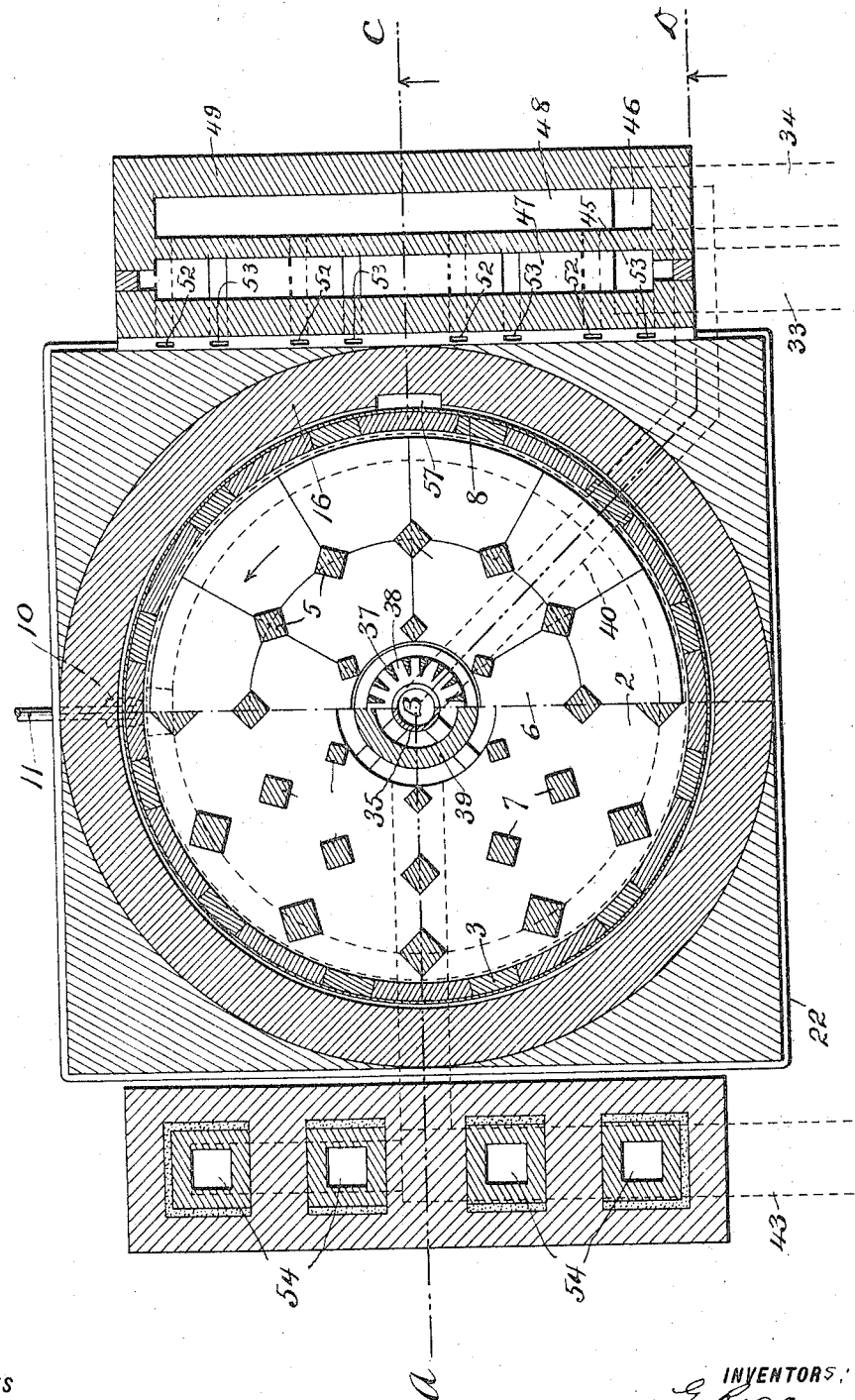

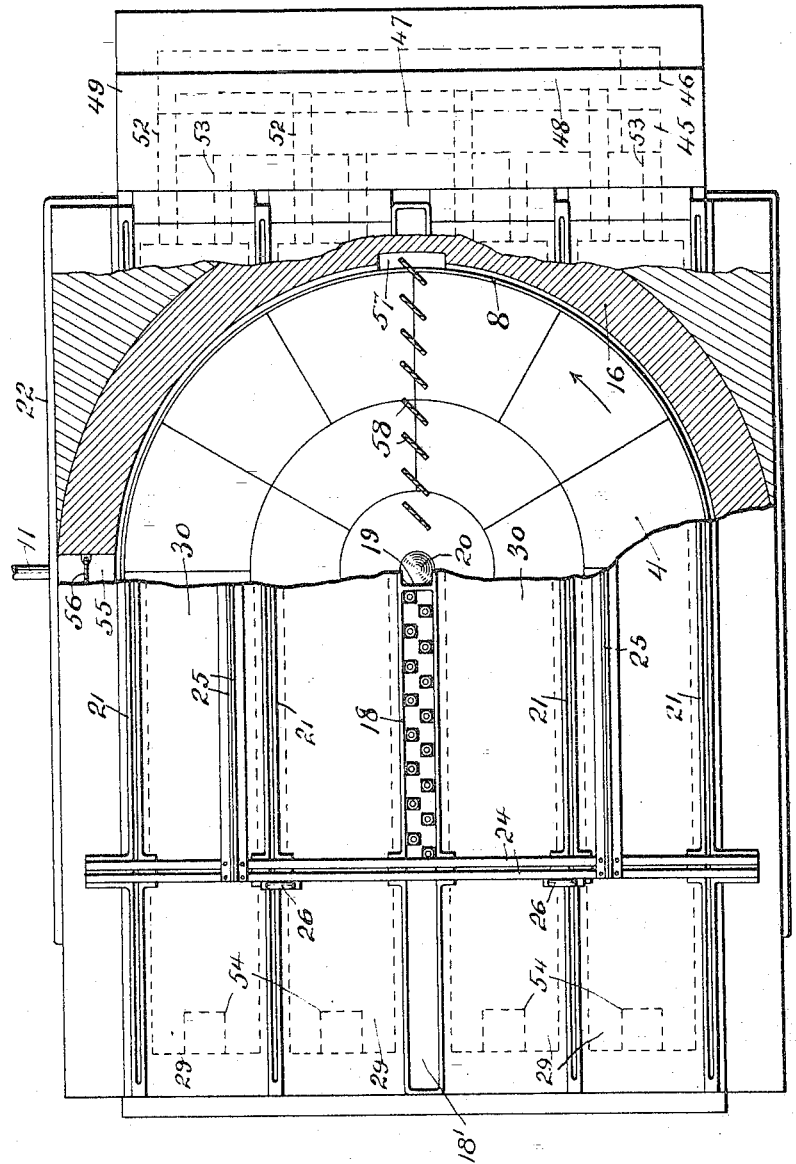

G. RIGG & W. L. COURSEN.
FURNACE.
APPLICATION FILED APR. 19, 1916.
1,220,789.
Patented Mar. 27, 1917.
5 SHEETS—SHEET 4.
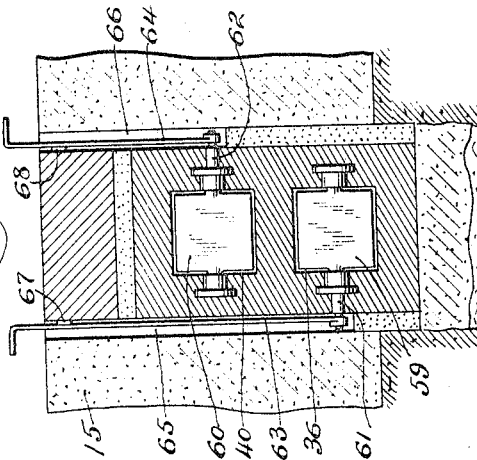
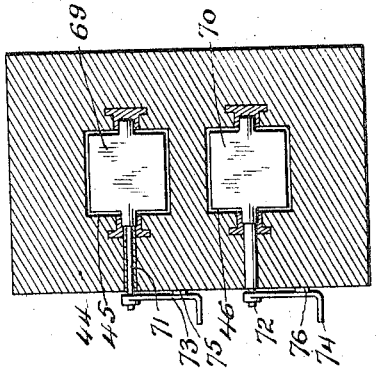
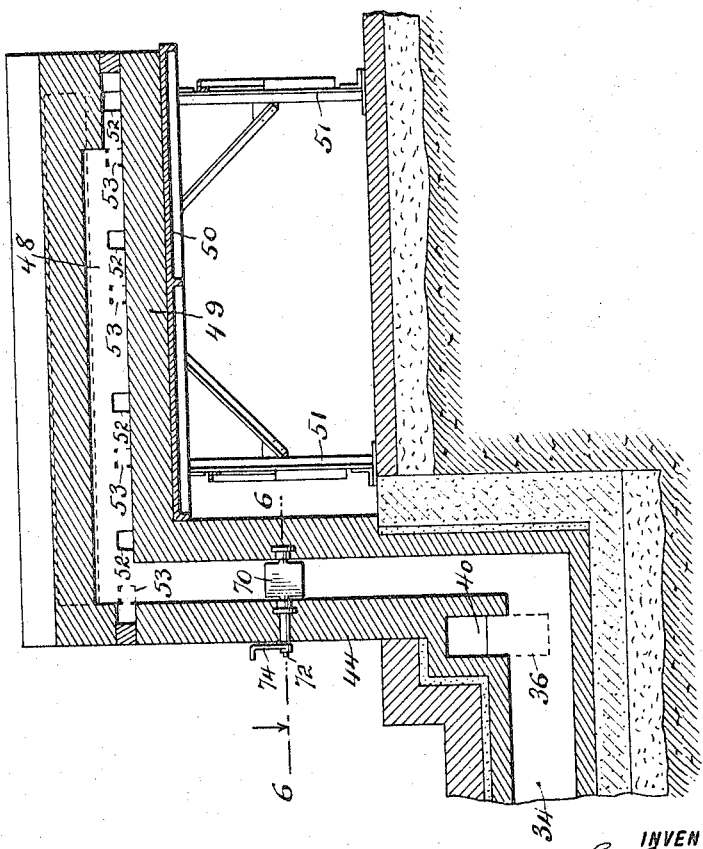

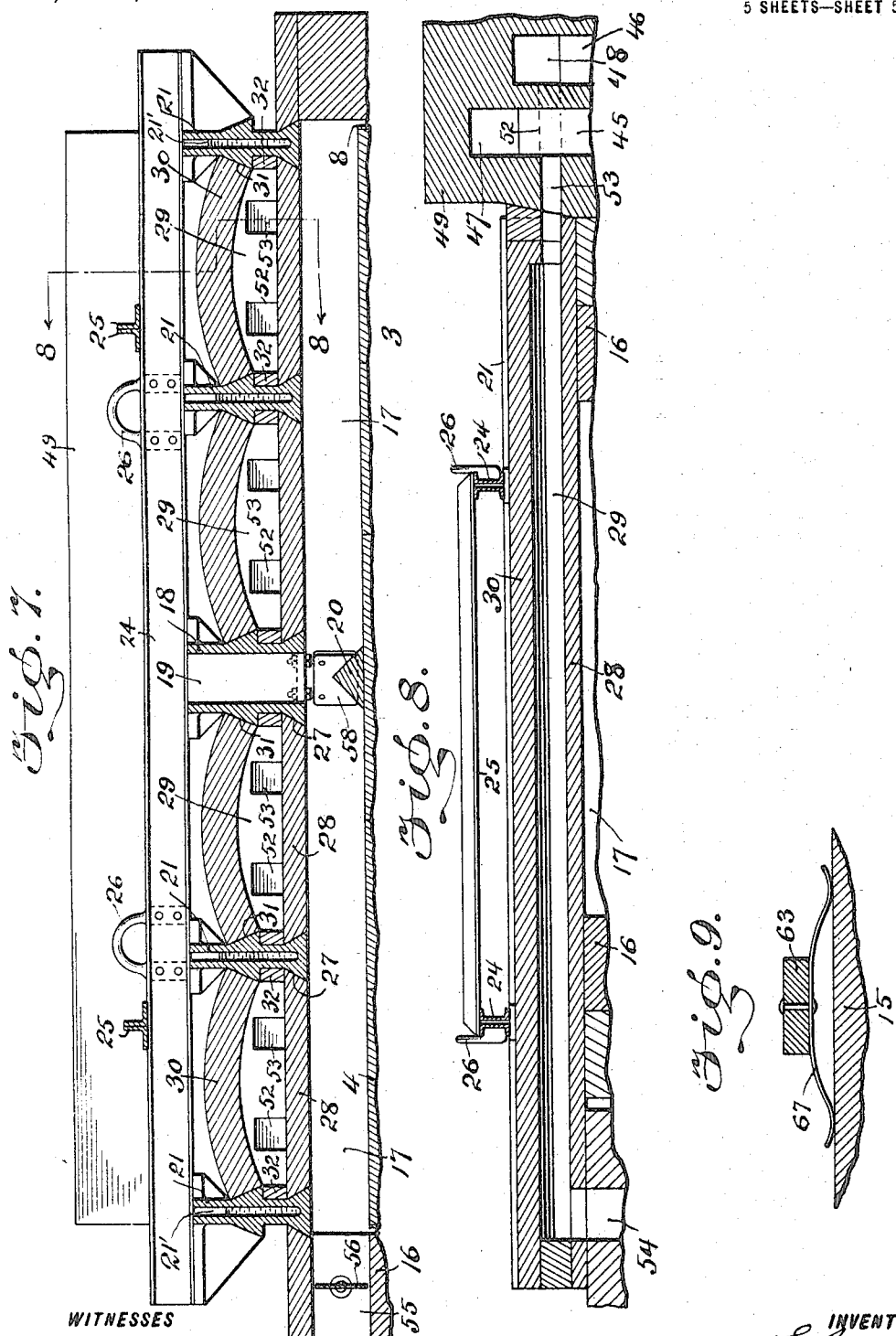

UNITED STATES PATENT OFFICE.

GILBERT RIGG, OF PALMERTON, PENNSYLVANIA, AND WALTER L. COURSEN, OF NEW ROCHELLE, NEW YORK, ASSIGNORS TO THE NEW JERSEY ZINC COMPANY, OF NEW YORK, N. Y., A CORPORATION OF NEW JERSEY.

FURNACE.

1,220,789.  Specification of Letters Patent.  Patented Mar. 27, 1917.

Application filed April 19, 1916. Serial No. 92,121.

*To all whom it may concern:*

Be it known that we, GILBERT RIGG and WALTER L. COURSEN, residing, respectively, at Palmerton, Carbon county, State of Pennsylvania, and New Rochelle, Westchester county, State of New York, have invented certain new and useful Improvements in Furnaces; and we do hereby declare the following to be a full, clear, and exact description of the invention, such as will enable others skilled in the art to which it appertains to make and use the same.

The present invention relates to improvements in furnaces for roasting, calcining, chloridizing, and otherwise treating ores and the like. Its main characteristic advantages are prominently displayed in furnaces of the rotary hearth type, to which the invention is particularly adapted and which has been chosen in the accompanying drawings to illustrate one of its embodiments in practice. It will be understood, however, that many of its novel features are likewise obviously adapted to use in so-called straight line furnaces and generally to furnaces having stationary hearths, for which reason we desire that the claims forming part of the specification shall have a correspondingly comprehensive interpretation.

In the drawings,—

Figure 1 represents a vertical sectional view of a rotary hearth furnace, embodying the invention, that portion of the furnace above the floor line E—F being shown as taken on a plane indicated by the line A—B—C of Fig. 2, and that portion below the floor line E—F being shown as taken on a plane indicated by the line A—B—D of Fig. 2;

Fig. 2 represents a horizontal sectional view, on the line 2—2 of Fig. 1;

Fig. 3 represents a top plan view of the furnace, a portion of which is illustrated as broken away to show in part the interior construction;

Fig. 4 represents a vertical sectional view, on the line 4—4 of Fig. 1;

Fig. 5 represents, on a larger scale, a vertical sectional view, on the line 5—5 of Fig. 1;

Fig. 6 represents, also on a larger scale, a horizontal sectional view, on the line 6—6 of Fig. 4;

Fig. 7 represents a vertical sectional view of the furnace roof, on the line 7—7 of Fig. 1, and on a larger scale;

Fig. 8 represents a vertical sectional view on the line 8—8 of Fig. 7; and

Fig. 9 represents a cross-sectional view of one of the operating levers for the dampers and shows the spring friction plate employed in connection therewith for maintaining the lever from accidental displacement in the position to which it has been shifted in the manipulation of the damper.

Similar numerals of reference indicate similar parts throughout the several views.

It will be noted that the construction characteristic of the invention, permits the furnace charge to be heated simultaneously from combustion chambers located below the hearth and in the roof of the chamber in which the charge is located, and that the roof is flat; so that, when the chamber containing the charge is full the charge is heated by direct contact not only with the hearth upon which it rests but with the roof itself without the intervention of a radiating space of unequal depth as in the customary roof of the arch type. The heating capacity of the lower and upper combustion chambers of the furnace is therefore used to corresponding advantage for the speedy and substantially uniform treatment of the charge,—particularly with respect to its upper layers.

The rotary hearth construction shown in the drawings comprises a horizontal base plate 1, which supports the refractory bottom 2 of the lower combustion chamber. The flat hearth 4 is composed of refractory tiles, preferably tongued and grooved at their meeting edges and the hearth is supported upon an annular wall 3, likewise of refractory material and also upon refractory piers 5, which rest upon a horizontal baffle partition 6, likewise constructed of tongued and grooved refractory tiles and which is itself supported by pier blocks 7 resting upon the bottom 2. The baffle partition 6 is concentric with the wall 3 and is separated therefrom by an annular space; so that, as hereinafter described, the products of combustion of the heating gases shall pass over the baffle partition 6, down through the annular space referred to and thence inwardly over the lower side of the baffle partition to a central point of downtake.

As shown in Fig. 2, the pier blocks 5 and 7 preferably increase in cross-sectional area from the inner location outwardly, and they are preferably disposed in such manner that radial lines drawn from the center of rotation of the hearth will pass through opposite angular edges of the pier blocks, thereby facilitating the thorough intermingling and homogeneous distribution of the heating gases.

An annular casing 8, preferably of sheet metal, encircles the hearth 4, the wall 3 and the bottom 2.

Secured to the under side of the base plate 1 is an annular crown gear 9 meshing with a pinion 10, (Fig. 2) secured to the shaft 11, which is rotated from any suitable source of power, thereby rotating the hearth in the direction indicated by the arrow in Figs. 2 and 3.

The base plate 1 is provided on its lower side with an annular depending flange 12 resting upon rollers 13 mounted in bearings 14 which are supported on the floor 15 of the structure.

Encircling and spaced slightly apart from the rotary hearth is an annular refractory wall 16, which forms the side wall of the charge receiving chamber 17 whose floor is the hearth 4 and whose roof is preferably removable.

Referring particularly to Figs. 1, 3, 7 and 8, it will be noted that the roof is provided with a central horizontal roof beam 18 having a vertical opening 19 through which the charge to be treated may be fed. To evenly distribute the charge thus fed, a conical deflector 20 is mounted on the hearth 4 with its axis in alinement with the vertical center of the feed opening 19.

At opposite sides of and parallel with the central roof beam 18 are additional roof beams 21, which, like the roof beam 18 rest upon the annular wall 16, the latter being supported upon a horizontal rectangular base 22 carried by standards 23, erected upon the floor 15, (see Fig. 1).

As shown in Figs. 1, 3 and 7, the roof beams 18 and 21 are provided with deep open channels 18' and 21', respectively, forming receptacles adapted to contain water for cooling purposes.

It is found in practice that by the use of the open channels containing the cooling water, the roof beams 18 and 21 are effectively protected against sagging under the heat of the furnace operation,—the water, under ordinary conditions of temperature attained in such furnaces being heated to a moderate temperature without excessive vaporization particularly after the under side of the roof beams has received a more or less thin refractory coating derived from the constituents of the furnace charge in those instances where the charge-receiving chamber is closely packed.

Secured transversely to the upper sides of the roof beams 18 and 21 are channel beams 24, to whose upper sides are secured angle bars 25. Fastened to the outer channel beams 24 are yokes 26, to which lifting tackle (not shown) is adapted to be secured for the purpose of raising and removing the roof when access to the interior of the chamber 17 for any purpose is desired, or when the roof requires renewal or repairs.

Opposite sides of the beams 18 and 21, adjacent to the lower edges thereof, are beveled downwardly and outwardly at 27 for the purpose of supporting horizontal refractory tiles 28, (Figs. 7 and 8), which likewise form the floors of a plurality of combustion chambers 29, having flat or arch roof tiles 30 (Figs. 3, 7 and 8), whose longitudinal edges bear against and are supported by downwardly and outwardly inclined surfaces 31, with which the opposite sides of each roof beam 18 and 21 are provided. The combustion chambers 29 are provided with refractory side walls 32, as shown in Fig. 7.

Suitable provision is made for the introduction of fuel-gas and air into the lower and upper combustion chambers which have been hereinbefore described, and for the removal therefrom of the resulting products of combustion.

Thus, as shown in Figs. 1, 2 and 4, 33 and 34 respectively designate the main conduits for supplying air and gas to the furnace. Extending centrally into the lower combustion chamber and through a central opening in the baffle partition 6 is an air uptake 35, the lower end of which communicates with a flue 36 connecting with the main air conduit 33.

Mounted upon the upper end of the uptake 35 is a cap 37, (Figs. 1 and 2) provided with radial discharge openings 38 located above the baffle partition 6. The air uptake 35 is located within and spaced apart from a vertical gas uptake 39, the upper end of which discharges into the combustion chamber above the baffle partition 6, and the lower end of which communicates with a gas flue 40, communicating with the main gas conduit 34.

The gas uptake 39 is located within and spaced apart from a down-take 41 for the products of combustion. The upper end of 41 communicates with the combustion chamber below the baffle partition 6, and at its base it communicates with a passage 42 leading into the stack flue 43.

The air supplied from the conduit 33 through the flue 36, uptake 35 and cap 37, mingles with gas supplied from the conduit 34 through the flue 40 and uptake 39, the mixture being burned in the combustion chamber above the baffle partition 6. The burning gases are thus distributed uniformly under the hearth 4, and pass outwardly in a radially spreading direction along the lower surface of the hearth 4 and over the upper surface of the baffle partition. They then pass downwardly around the outer edge of the baffle partition and then sweep inwardly along its under surface, and finally escape through the downtake 41 and flue 42 to the stack-flue 43.

In passing through the downtake 41, the hot products of combustion encircle the gas uptake 39, thereby imparting heat to the incoming gas and to the air entering through the concentric inner air uptake 35.

The location of the baffle partition midway of and across almost the entire width of the combustion chamber in which it is located makes it an efficient means for directing the gases to the outermost periphery of the chamber and for causing them to impart a high temperature to the hearth throughout its whole extent thereby increasing correspondingly its effective heating area. Moreover, the relatively large mass of the baffle partition and the circumstance that it is traversed across its whole area first on one side and then on the other by the hot products of combustion causes it to serve as a constant reservoir of heat, tending to equalize and render unimportant any irregularities that may occur, from time to time, in the heat due to the combustion of the fuel.

The combustion chambers 29 are supplied with fuel gas and with air for burning the gas by passages 45 and 46 connecting respectively with the main air conduit 33 and the main gas conduit 34 (see particularly Figs. 2, 4 and 6). The passages 45 and 46 are built in the brickwork structure 44 and they communicate at their upper ends with horizontal passages 47 and 48 provided in the brickwork 49, whose weight is supported by a base-plate 50 mounted and braced upon standards 51 (Figs. 1 and 4). Horizontal passages 52 terminating in air inlet ports connect the passage 48 with the combustion chambers 29, and similar horizontal passages 53 terminating in gas inlet ports connect the gas passage 47 with the combustion chambers. At their discharge ends, the combustion chambers connect by means of vertical flues 54 with the horizontal stack flue 43, whereby the products of combustion from the several combustion chambers are conveyed into the open air.

The chamber 17 is provided in its wall 16 with an outlet opening 55 (see Figs. 3 and 7) for the discharge of gases, and this outlet opening may be provided, as shown, with a suitable regulable cut-off valve or damper 56. So also, as shown in Figs. 1, 2 and 3, the inner face of the wall 16 is provided with a vertical passage 57, through which the material treated in the chamber 17 is progressively discharged by the action of the stationary stirrers 58 in connection with the rotation of the hearth. The material may be received in any appropriate receptacle and removed as desired. For preventing any excessive upflow of air through the space between the inner face of the wall 16 and the outer face of the rotatory combustion chamber a thin annular metal plate 79 is provided, attached along one of its edges to the sole plate 22 and making slight frictional engagement with a depending edge flange on the rotatory plate 1. It will, of course, be understood that, in order to provide for a continuous discharge through the passage 57, a corresponding opening may be provided in the plate 79 immediately below said passage, as indicated, for instance, in Fig. 1.

For gradually working the charge to be treated from the center of the rotary hearth 4 toward the periphery thereof and into the discharge passage 57, there are secured to the under side of the roof beam 18, a plurality of deflecting plates 58 disposed in and obliquely to a diametrical plane which intersects the cone 20 and discharge passage 57. The disposition of the deflecting plates 58 is such that, when the hearth 4 is turned in the direction indicated by the arrow in Fig. 3, the charge will be gradually and progressively shifted from the center of the hearth floor outwardly, and will be finally discharged into the passage 57.

For regulating the supply of air and gas through the flues 36 and 40 there may be provided in said flues dampers or valves 59 and 60, mounted on rock shafts 61 and 62, to which are secured operating levers 63 and 64, (Fig. 5) mounted in slots 65 and 66 provided in the floor 15. As shown in Fig. 9, the lever 63 may have secured to it a bow spring 67 the ends of which are adapted to exert a sufficient pressure against the material forming the floor 15 to retain the lever in the position to which it may be adjusted. A similar bow spring 68, (Fig. 5), may be secured to the lever 64 and will serve a similar purpose in connection with said lever.

In the passages 45 and 46 respectively are valves or dampers 69 and 70, mounted upon rock shafts 71 and 72, to which are secured operating levers 73 and 74, (Figs. 4 and 6), provided with bow springs 75 and 76, similar to the bow spring 67, and which are adapted to bear against the outer face of the flue 44, for the purpose of retaining the dampers or valves 69 and 70 in the positions to which they may be adjusted.

In the operation of the invention, the dampers or valves 59 and 60 and 69 and 70, are set in the open position, and gas and air are supplied to the chamber below the hearth 4 and into the upper combustion chambers 29 through the passages hereinbefore described, the gas thus discharged into said combustion chambers being ignited, thereby eventually raising the temperature in the chamber 17 to the degree required for the proposed treatment of the furnace charge.

The hearth 4 is rotated by means of the mechanism described, and the charge to be treated is fed into the chamber 17 and upon the hearth through the feed opening 19. The rotation of the hearth, in connection with the deflecting plates 58, will cause the charge to be progressively spread out slowly toward the periphery of the hearth. During this outward spreading movement of the charge it is subjected to heat imparted to it from the combustion chamber underlying the hearth and from the combustion chambers 29 in the roof structure, and the conditions of temperature, rate of rotation of the hearth, inclination of the deflecting plates, and the like, are so calibrated to the particular furnacing of the charge intended that the finished material discharged progressively through the passage 57 will have received the treatment intended.

As hereinbefore indicated, the flat roof is of particular advantage, for the reason that the floors of the upper combustion chambers 29 are thus brought into close proximity to the upper surface of the charge, in contradistinction to the varying distance of the ordinary arched roof. Moreover, the advantage thus gained is not only in proximity of the upper combustion chambers to the upper surface of the furnace charge but also uniformity of transmission of the heat over the entire upper surface of the charge, where, as is usually the case, such uniformity is desired. These advantages of the flat roof, in its relation to the heating of the charge, are obviously not restricted to furnaces of the rotary hearth type, but are likewise present to a corresponding degree in furnaces wherein the hearth is stationary, and, as before noted, we desire our invention, in this respect, to have a correspondingly broad interpretation.

What we claim is:

1. A furnace, for roasting, calcining, and similar purposes, provided with a removable roof having a substantially flat bottom, said roof containing a series of combustion chambers and intervening water-cooled supports.

2. A furnace, for roasting, calcining, and similar purposes, provided with a roof having a substantially flat bottom and a central feed opening, said roof containing a series of combustion chambers and provided with means by which said roof may be bodily removed or replaced.

3. A furnace, for roasting, calcining, and similar purposes, provided with a roof made up of a series of beams spaced apart and connected by flat bottom tiles flush with the lower edges of said beams and by arched roof tiles, thereby constituting a series of combustion chambers, means for supplying gas and air to said combustion chambers and for removing the products of combustion.

4. A furnace, for roasting, calcining, and similar purposes, provided with a roof having a series of roof beams channeled for the reception of a cooling medium, flat tiles spanning the lower portions of said beams and forming therewith the bottom of the roof structure, tiles arched between said beams above the flat tiles and forming therewith combustion chambers, means for supplying air and fuel to the combustion chambers and means for removing the products of combustion.

5. A furnace, for roasting, calcining, and similar purposes, provided with a roof having a series of roof beams provided at their bases with inclines, flat tiles spanning the beams and resting upon the inclines, said beams being further provided with an upper series of inclines, tiles spanning the beams and resting upon the upper series of inclines, thereby forming with the flat tiles a series of combustion chambers, means for supplying air and fuel to the combustion chambers and means for withdrawing the products of combustion.

6. A furnace, for roasting, calcining, and similar purposes, provided with a removable roof having a series of roof beams, and having combustion chambers intermediate of the roof beams, the floors of the combustion chambers being substantially flat and their roofs being arched.

7. A furnace, for roasting, calcining, and similar purposes, provided with a removable roof having a series of straight roof beams, tiles spanning the roof beams and forming the top and bottom of the roof, and lifting beams extending across the roof beams and connected therewith.

8. A furnace, for roasting, calcining, and similar purposes, provided with a removable roof having a series of straight roof beams, tiles spanning the roof beams and forming the top and bottom of the roof, lifting beams extending across the roof beams and connected therewith, and angle irons connecting and bracing the lifting beams.

9. A furnace, for roasting, calcining, and similar purposes, having a central water-cooled roof beam provided with a feed opening at its center and having a series of deflecting plates attached directly to said roof-beam whereby they may be cooled by the water.

10. A furnace, for roasting, calcining, and similar purposes, having a central roof supporting beam provided with a feed opening at its center and having a series of deflecting plates attached directly to said roof-beam, said beam being provided with a deep open recess for the reception of cooling water.

11. A furnace, for roasting, calcining, and similar purposes, provided with a roof having a series of roof supporting beams provided with deep open channels, said roof supporting beams being spanned at their lower parts by flat tiles and being spanned above the flat tiles by arched tiles, thereby forming a series of combustion chambers, means for supplying air and fuel to the several combustion chambers and for removing the resulting products of combustion, and means for bodily removing and replacing the roof.

12. A furnace, for roasting, calcining, and similar purposes, provided with a rotary hearth having a combustion chamber for heating the hearth from below, and having a removable roof with a flat bottom heated by combustion chambers of which the said flat bottom forms the floor, and means of communication between the combustion chamber below the hearth and the combustion chambers within the roof.

13. A furnace, for roasting, calcining and similar purposes, provided with a roof having a series of combustion chambers arranged side by side therein, means for lifting the roof, a structure having air and gas passages registering with the inlet ends of the combustion chambers and a structure having a series of outlet flues for products of combustion and registering with the discharge ends of the combustion chambers.

14. A furnace, for roasting, calcining, and similar purposes, provided with a rotary hearth floor, an inclosure below said floor forming therewith a combustion chamber, air and fuel uptakes to said chamber, and a downtake for the products of combustion, said downtake surrounding the air and fuel uptakes.

15. A furnace, for roasting, calcining, and similar purposes, provided with a rotary hearth floor, an inclosure below said floor forming therewith a combustion chamber having central air and fuel inlets and an outlet for the products of combustion, and a transverse baffle partition intermediate of said inlets and said outlet and extending adjacent to but spaced apart from the inner wall of said chamber.

16. A furnace, for roasting, calcining, and similar purposes, provided with a rotary hearth floor, an inclosure below said floor forming therewith a combustion chamber having central air and fuel inlets and an outlet for the products of combustion, and a baffle partition intermediate of said inlets and said outlet and disposed substantially midway between the top and bottom of the chamber and spaced apart from the side wall of said chamber.

17. A furnace, for roasting, calcining, and similar purposes, provided with a rotary hearth floor, an inclosure forming with said floor a combustion chamber having a centrally located outlet for the products of combustion, means for feeding air and fuel into the center of said chamber, and means by which the products of combustion are projected laterally in all directions from the center toward the side wall of the chamber along the lower surface of the hearth and then inwardly along the lower surface of the combustion chamber to said outlet.

18. A furnace, for roasting, calcining, and similar purposes, provided with a rotary hearth having a floor which serves as the top of a combustion chamber and having a roof provided with a combustion chamber, and means for supplying said combustion chambers with air and fuel.

19. A furnace, for roasting, calcining, and similar purposes, provided with a rotary hearth, side walls encircling said hearth, and a roof removably supported upon said side walls and provided with a combustion chamber.

20. A furnace, for roasting, calcining, and similar purposes, provided with a rotary hearth, side walls encircling said hearth, a roof removably supported upon said side walls and provided with a combustion chamber, a flue adapted to be connected with said chamber when it is in the operative position on said walls, and means for supplying said chamber with air and fuel when the chamber is in the operative position.

21. A furnace, for roasting, calcining, and similar purposes, provided with a rotary hearth, side walls encircling said hearth, a roof provided with a combustion chamber having openings in its opposite ends and removably mounted on said walls, a flue into which one end of said chamber discharges when the roof is in the operative position, and means for feeding air and fuel into the other end of said chamber when the roof is in the operative position.

22. A furnace, for roasting, calcining, and similar purposes, provided with a rotary hearth, side walls encircling said hearth, a removable roof provided with a combustion chamber, and means for supplying said chamber with air and fuel.

23. A furnace, for roasting, calcining, and similar purposes, provided with a rotary hearth having a flat horizontal floor, a roof having a flat horizontal heating surface forming with the hearth floor respectively the top and bottom of the charge receiving chamber, and a central intake for the charge.

24. A furnace, for roasting, calcining, and similar purposes, provided with a rotary hearth floor, an inclosure below said floor forming therewith a combustion chamber having central air and fuel inlets and an outlet for the products of combustion, a transverse baffle partition intermediate of said inlets and said outlet, and piers for supporting said baffle partition, said piers being of increasing cross-sectional area from the inner location outwardly and being arranged with their diagonals radially disposed with respect to the center of said floor to facilitate the mixing of air and fuel.

In testimony whereof we affix our signatures in presence of two witnesses.

GILBERT RIGG.
WALTER L. COURSEN.

Witnesses:
H. P. HEAVISIDE,
B. G. MEIER.